United States Patent
Korson

(10) Patent No.: US 9,308,791 B2
(45) Date of Patent: Apr. 12, 2016

(54) ELEVATED CRADLE FOR SUPPORTING CONDUITS EXTENDING BETWEEN A VEHICLE TRACTOR AND TRAILER

(71) Applicant: Albert Korson, Traverse City, MI (US)

(72) Inventor: Albert Korson, Traverse City, MI (US)

( * ) Notice: Subject to any disclaimer, the term of this patent is extended or adjusted under 35 U.S.C. 154(b) by 0 days.

(21) Appl. No.: 14/186,329

(22) Filed: Feb. 21, 2014

(65) Prior Publication Data
US 2014/0167390 A1   Jun. 19, 2014

Related U.S. Application Data

(63) Continuation-in-part of application No. 13/209,819, filed on Aug. 15, 2011, now abandoned.

(60) Provisional application No. 61/508,258, filed on Jul. 15, 2011, provisional application No. 61/407,682, filed on Oct. 28, 2010.

(51) Int. Cl.
| | |
|---|---|
| *F16L 3/00* | (2006.01) |
| *B60D 1/62* | (2006.01) |
| *F16L 3/205* | (2006.01) |
| *A47G 29/00* | (2006.01) |
| *B05B 15/06* | (2006.01) |
| *F16L 3/08* | (2006.01) |
| *F16L 3/12* | (2006.01) |
| *F16M 13/00* | (2006.01) |

(52) U.S. Cl.
CPC .. *B60D 1/62* (2013.01); *F16L 3/205* (2013.01)

(58) Field of Classification Search
CPC .............. F16L 3/12; F16L 3/18; F16L 3/205; F16L 3/16; B01D 1/62; E02B 3/20
USPC ........ 248/560, 618–627, 637, 638, 74.3, 671, 248/65, 68.1, 69, 74.1, 74.2; 280/420, 421, 280/422; 411/12, 262, 289, 299, 318, 341, 411/342, 343, 552, 438, 929.1
See application file for complete search history.

(56) References Cited

U.S. PATENT DOCUMENTS

| | | | | |
|---|---|---|---|---|
| 2,733,033 | A * | 1/1956 | Gunderson | B60T 17/046 191/64 |
| 2,978,217 | A * | 4/1961 | Gunderson | B60T 17/046 248/160 |
| 2,984,445 | A * | 5/1961 | Dobrikin | B60D 1/62 248/51 |
| 3,030,056 | A * | 4/1962 | Rogers | F04B 39/127 248/565 |
| 4,033,193 | A * | 7/1977 | Brander | B06B 1/164 74/61 |
| 4,238,096 | A * | 12/1980 | Dvorachek | F16L 3/16 248/160 |
| 4,575,040 | A | 3/1986 | Seely | |
| 4,691,892 | A | 9/1987 | Grewe et al. | |
| 6,547,191 | B2 | 4/2003 | McDonald | |
| 6,916,014 | B1 * | 7/2005 | Thomas | H02G 1/06 254/134.3 R |
| 2002/0130223 | A1 * | 9/2002 | McDonald | E02B 3/20 248/49 |
| 2011/0031373 | A1 * | 2/2011 | Fortes | B64D 43/00 248/600 |

* cited by examiner

*Primary Examiner* — Jonathan Liu
*Assistant Examiner* — Muhammad Ijaz
(74) *Attorney, Agent, or Firm* — Mitchell Law PLLC; Matthew W. Mitchell

(57) ABSTRACT

A cradle for supporting conduit extending between a truck and articulating trailer. The cradle includes a radially curved and open ended body which is resiliently supported upon an adjustable vertical support member for permitting lay-in receipt of the harness. A mounting assembly for the vertical support member positions the same atop a platform extending between the tractor and trailer and, in one non-limiting variant, is constructed of two parallel plate members with three or more compression/extension spring combinations.

12 Claims, 9 Drawing Sheets

ELEVATED CRADLE FOR SUPPORTING CONDUITS EXTENDING BETWEEN A VEHICLE TRACTOR AND TRAILER

CROSS-REFERENCE TO RELATED APPLICATIONS

This application is a Continuation-in-part of application Ser. No. 13/209,819 filed on Aug. 15, 2011. Application Ser. No. 13/209,819 claims the benefit of U.S. Provisional Application 61/508,258 filed on Jul. 15, 2011. Application Ser. No. 13/209,819 claims the benefit of U.S. Provisional Application 61/407,682 filed on Oct. 28, 2010, the contents of which are incorporated herein in their entirety.

FIELD OF THE INVENTION

The present invention discloses an elevated cradle situated between the tractor and trailer and which is adapted to receive, in an intermediate draping and elevated fashion, any plurality of conduits. The cradle can exhibit any channel or guide supporting structure, such as for enabling lay-in of the conduits without the necessity of detaching the same from either the tractor or trailer, the cradle further being configured to permit each of multi-axial or eccentric adjustment in response to pulling forces exerted by the conduits (i.e. in response to articulation between the tractor and trailer) as well as permitting a degree of slidable displacement of the conduits.

BACKGROUND OF THE INVENTION

Truck tractors have various hoses and electrical cables, collectively referred to as conduits, which extend from the rear of the tractor (cab) to engage a trailer, such as which is further supported in articulating fashion behind the tractor. The purposes of these hoses includes operation of brakes, lights and other equipment installed on or in the truck trailers. Various lengths of hoses and cables are needed to connect the truck tractor with each respective truck trailer, and the required length varies depending upon the angular orientation of the tractor and the trailer during operation.

As demonstrated in prior U.S. Pat. No. 5,909,861, the distance between the hose cable connecting points on a truck tractor and a truck trailer in a straight forward horizontally aligned position, with the truck trailer directly behind the truck tractor, is less than when, in a turning or maneuvering position, the track tractor is turned at a substantial angle to the truck trailer. It is a common feature of vehicles in the tucking industry that hoses and cables are constructed of lengths which will easily accommodate the longest anticipated distance between the connection access points of each truck tractor and the corresponding truck trailer.

When hoses are of sufficient length to accommodate the longest possible distance, there is usually a significant amount of slack when the truck tractor and the track trailer are horizontally aligned. In this particular orientation, unless sufficiently supported, these hoses are subject to damage from a variety of sources, including abrasion, kinking, as well as being susceptible to being improperly engaged with other projections or obstructions on the truck or trailer body surface while hanging loosely, and potentially severed or otherwise damaged when the alignment between the truck tractor and the truck trailer is again changed.

As reference to the prior art demonstrates, prior hose supports include those with rail connections directed to the rear side of a tractor's cab. In such applications, a spring or strap is slidably mounted on a first end to the rail. A second end of the strap or spring engages the hoses and cables near their midpoint suspending them above the truck's frame. During maneuvers tending to tension the hoses and cables, the first end of the strap or spring moves laterally along the rail allowing the hose or cables to be suspended above the frame of the truck without developing excess tension. These types of supports may communicate undesired vibrations into the cab from road-induced movement of the cables, particularly if springs are employed. Other disadvantages include the fact that the length of the hoses are cables extending beyond the support may be too long for the rail to adequately support the hoses and cables when they are uncoupled from the trailer.

Another device known to the prior art is a vertically aligned post or rod device, mounted to the tractor frame on a spring base, which engages the hoses and cables approximately midway between the tractor and trailer. The spring base allows the support post to be bendably resilient. Such applications, similar to the within invention, do not transmit vibrations directly into the cab. The hoses or cables cause the post to bend or pivot relative to its base with the tractor and trader at an angle to each other and thereby prevents the development or undesirable levels of tension. When the tractor is again aligned with the trailer, the spring restores the post to an upright position. As with the rail support, when a tractor and the hoses and cables are disconnected from the trailer, they may hang lower than desired, making them vulnerable to be damage or to damage other components.

Prior art applications of spring-base mounted supports, however, have either not allowed a complete 90° pivot at the base, or have been too flexible to immediately return the vertical support member to upright status. Further, previous applications which have involved compression springs and bolts or other one-piece retaining devices have resulted in permanently bending the support bolts if the compression springs were compressed closed to the point which would have allowed the upright vertical support member to bend to 90°, from its vertical position.

The post-type, spring-based applications, to date, however, typically lack sufficient ability to both incline a sufficient distance from the vertical position, under tension, and in so doing, retain the ability to return immediately to the vertical, concurrent with the realignment of the tractor truck and track trailer. Likewise, the mounts provided in the prior art atop such posts or pedestal-type applications may kink the hoses or cables, and do not allow or provide an optimum, radial, support for the hoses or cables, either at rest or under tension. Further, prior applications which have the hose retaining device or cradle rigidly affixed to a support member, from the standpoint of durability of the device itself, tend to break, or bend, under pressure.

SUMMARY OF THE INVENTION

The present invention discloses a cradle for supporting any plurality of conduits extending between a truck cab (also termed a tractor) and attached (typically articulating) trailer. The cradle in one non-limiting embodiment includes a body exhibiting a through extending channel and which is supported atop a vertical member extending from a floor location between the tractor and trailer.

The cradle can exhibit an arcuate shape and may further be separable to permit lay-in receipt of an intermediate location of the conduits. In non-limiting variants, the cradle can include any of hinged sections or an upper edge extending slit defining split portions for laying in the conduit and which are held together by resilient bands. The manner in which the cradle is supported atop the vertical member is such that cradle is permitted any degree of multi-axial (e.g. eccentric) pivotal and/or displaceable support in response to articulation between the tractor and trailer, the laid-in conduits further allowed to displace relative to the elevated and supporting location provided by the cradle.

Additional variants can include the provision of an adjustable vertical support member, in combination with a tubular hose support cradle radially angled to approximately 90°, mounted atop the vertical support member and a mounting assembly which allowed the vertical support member to return pivotally to its base under spring tension to approximately 90° maximum front the vertical, in any direction.

The vertical support includes, in one non-limiting application, a base mounting member which is comprised of a pair of parallel plates. The lower plate is affixed to the rear platform of the truck tractor. A plurality of lower compression spring members are attached, equidistant, about the perimeter of the lower plate and support the parallel upper plate. Each of the lower compression spring members, has a further corresponding upper compression spring member centered above the lower compression spring member.

The compression spring members for each spring assembly are held in place by an extension spring initially contained within the lower compression spring, attached to the lower base plate. The upper end of each extension spring member is attached to a clevis-type bolt, extending downwardly through the corresponding upper extension spring member, with the clevis-type bolt threaded at the upper end, and a nut tightened on it to appropriate tension to hold the upper and lower compression spring members in place.

Approximately centered upon the upper base plate is an upright support member. This support member is generally vertically inclined, and rigidly attached at its lower end to the upper base plate. In practice, the support member is telescoping, with one tubular member slidably contained in another and held in desired place by a pin insertable through one selected set of a plurality of correspondingly aligned apertures in both telescoping members.

When angular pressure is exerted upon on the upper portion of the support member, toward a particular side of the device, the lower compression springs on one side beneath the upper base plate are compressed and the upper compression spring or springs approximately opposite and above the upper base plate are compressed by the relative downward movement on the first side, and upward movement on the second side, of the upper base plate.

Atop the vertical support member is a hose cradle. The primary feature of the hose cradle is a lower curved portion, radially bent over the to of the vertical support member in practice, to approximately 90°, with a key feature being that the radially support member has a continuous curved bottom, downwardly concave, with sides high enough to hold the supported hoses.

As also previously described, and without limitation, the hose cradle is tubular with the supported hoses or other conduit (e.g. defined as any electrical or fluid communicating line typically exhibiting some degree of flexibility) extending through the hollow interior portion thereof. In practice, as stated, so long as the lower concave portion has sides high enough to support the hoses, it is not necessary for the upper portion to be closed and, to the extent closure is desired, it may be accomplished by a hinged upper portion which may be opened to insert the hoses and closed to insure they are held in place, or other straps, or containment means removably placed over the hoses, once they are placed in position on the radial support cradle.

As previously indicated, the radial support cradle in one non-limiting embodiment is not rigidly attached to the vertical support member. In one further non-limiting variant, the radial support cradle, along its bottom edge, is proximately centered on top of the vertical support member, with at least one extension spring, under tension, on each side, attached to the cradle at one end, and to the support member at the opposite end, so that the radial cradle has the ability to move for and aft, as well as sideway's, under tension to the extension spring or springs on each side, which spring or springs also return it to its original position, when the force causing the movement is released.

In a further variant, either a single or dual concentric coil spring configuration can be provided, arranged in internally seated and supported fashion within an open upper extending end of the vertically extending support member. A bolt or like fastener extends through a bottom location of the arcuate shaped cradle and is engaged to either or both of the springs in order to bias the cradle. The fastener can include a shaft end situated aperture for receiving a hook or other projection associated with such as in inner concentric positioned one of the springs, this in order to provide resilient support for the cradle in response to bending forces introduced by the pulling of the conduits against the inner supporting surfaces of the cradle.

BRIEF DESCRIPTION OF THE DRAWINGS

Reference will now be made to the attached drawings, when read in combination with the following description, wherein like reference numbers refer to like parts throughout the several views, and in which.

DETAILED DESCRIPTION OF THE PREFERRED EMBODIMENTS

Figure 1:
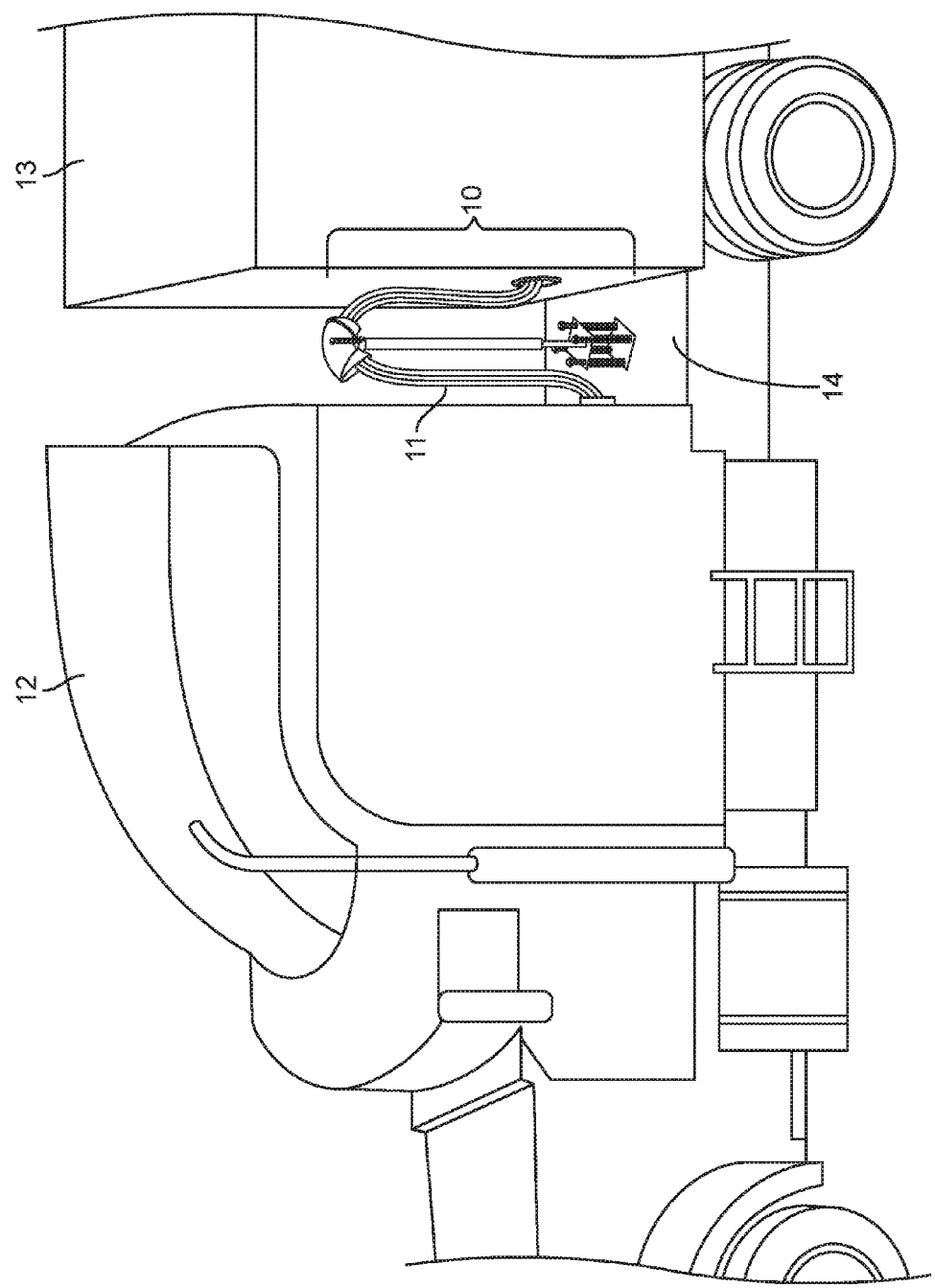
FIG. 1 is an environmental perspective view of a tractor trailer assembly, including the rearward portion of a truck tractor and the forward portion of an attached and inter-articulating truck trailer, showing the elevated cradle supporting an intermediate portion of the extending conduit.

As previously described, the present invention discloses an elevated cradle for supporting any number of flexible conduits (e.g. hoses and electrical codes) extending between and used in standard operation of a truck tractor and accompanying towed truck trailer. Referring first to FIG. 1, the cradle supporting crevice is generally referenced at 10 in perspective with supported hoses and like conduit, farther at 11, extending between a towing vehicle, truck tractor 12, and the towed vehicle, truck trailer 13. As further shown, the hose support device, as will be further described in detail, is fixably mounted on the rear platform or bed 14 of the truck tractor 12, forward of the trailer 13.

In one non-limiting variant, the invention 10 in one configuration can incorporate three basic components, a hose cradle assembly 20, a substantially upright or vertical support member or rod 30 and a base assembly 40. These components are shown in perspective in FIG. 2, and in more detail, in exploded view, in FIG. 3. Support assembly is primarily depicted by an elongated member which has an upper end 31 and a lower end 32. Member 30 has a defined adjustable length A defined by the distance between lower end 32 and upper end 31. In one preferred embodiment, this adjustable feature is provided by a telescoping feature wherein the upper portion of support 30 adjacent upper end 31 is tubular and telescopingly conforming to accept the lower portion 34 of support 30, also tubular, within it in male-female relationship.

Figure 2:
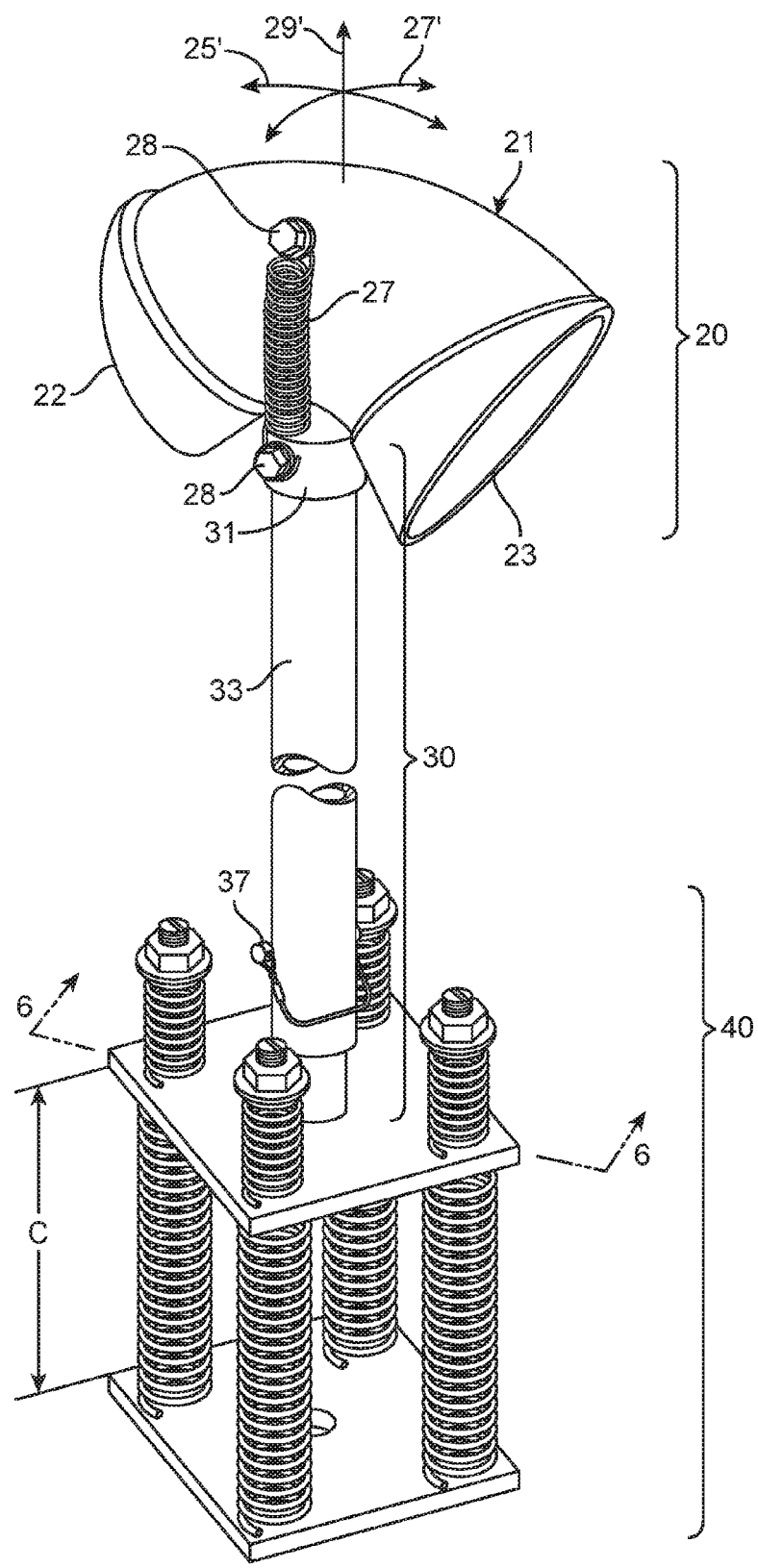
FIG. 2 is an enlarged and perspective illustration of the cradle according to one non limiting variant of the present invention.

The upper portion 33 of support 30 further contains a plurality of vertically aligning holes 35 extending therethrough and the lower portion 34 of support 30 has a plurality of corresponding vertically aligned holes 36 extending therethrough. When lower portion 34 is inserted within upper portion 33 of support 30, one extending, hole 35 is aligned with one extending hole 36 and a pin 17 is inserted, as shown in FIG. 2, holding support 30 in position at defined height/length A.

Figure 6:
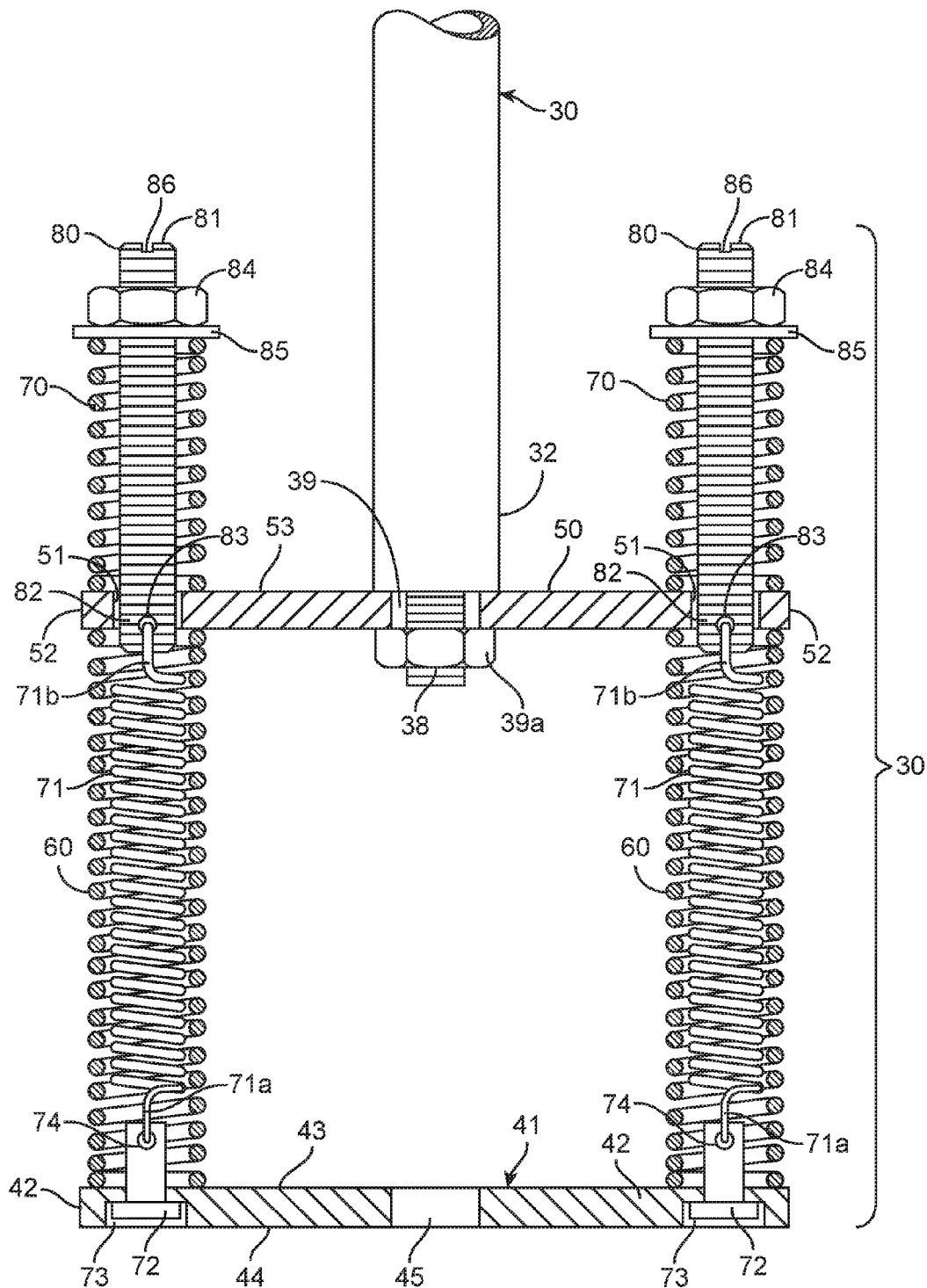
FIG. 6 is a side cutaway view of the horizontal lower and upper support plates of the vertical support, showing the lower and upper compression spring members, contained expansion spring member, and clevis-type bolt attachments, both on the lower base plate and above the upper base plate.

Support 30 is rigidly attached at its lower end 32 to base assembly 40. The method of such attachment is not in limitation of the invention 10 and may be a bolt 38, either conformably threaded with a conforming aperture 39 in base assembly 40, or passing through aperture 39 and held by a corresponding threaded bolt 39a as shown in FIG. 6 or by welding or other common means.

Figure 4:
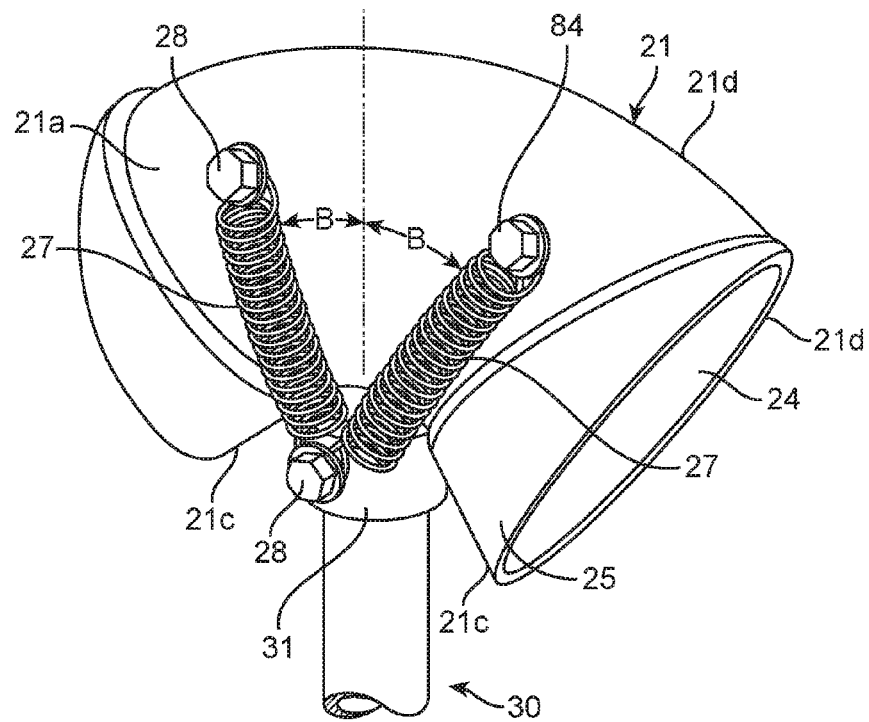
FIG. 4 is an upper sectional perspective of a cradle similar to that shown in FIG. 2 and which exhibits a radial extending body located atop a vertical support member and restrained by a pair of expansion springs for support.
Figure 5:
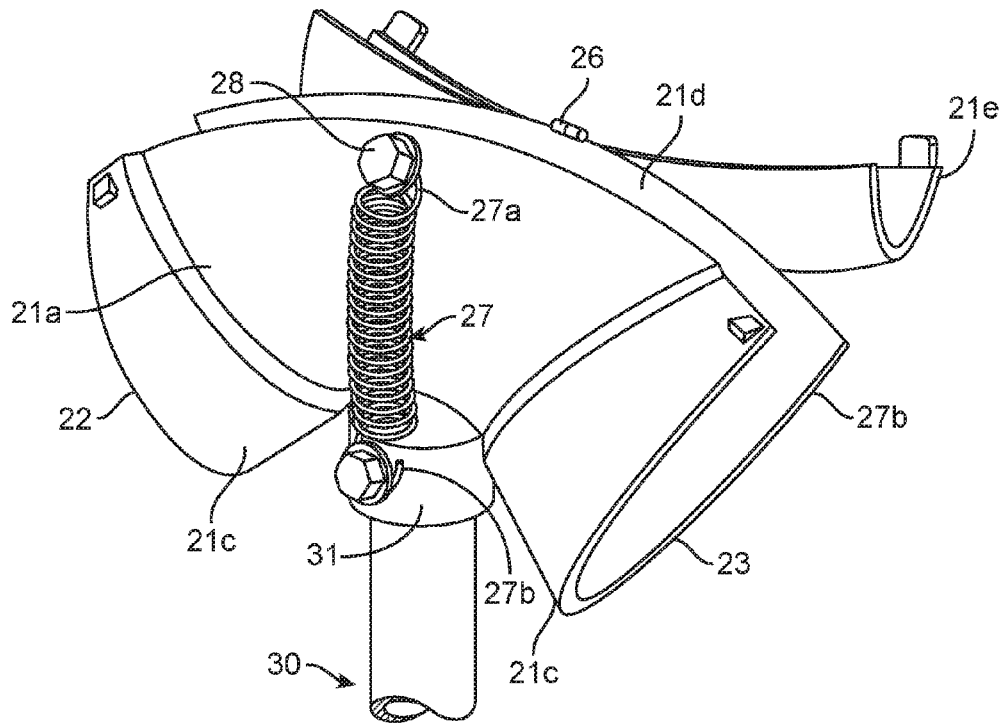
FIG. 5 is an upper sectional perspective of a further variant of cradle and which illustrates a main body supported by springs atop the vertical member, with a hingedly attached and openable top section for ease of inserting the supported conduits.

The hose support cradle assembly 20 is mounted on the upper end 31 of the support 30. The primary cradle member or body 21 has a first end 22 and a second end 23 and is inwardly and downwardly concave as particularly illustrated in FIG. 5. In practice, it may be tubular with an inner surface 24 and outer surface 25, as shown in FIGS. 1, 2, 3 and 4. The primary cradle member 21a has a first side 21, as second side 21b, a bottom 21c and a top 21d. As shown in FIG. 5, top 21d may be open so that the hoses 11 may simply be placed on the cradle member 21 as opposed to being threaded therethrough.

Because the inwardly concave interior surface 24 of cradle 21 with sides 21a and 21b extending outwardly and upwardly as shown in FIG. 5 provides a retention means for hoses 11, top 21d may be left open, or a hinged top 21e may be provided, moveably opened or closed by hinge 26. When closed, cradle 21 is functionally tubular as shown in FIG. 4. In practice, if having an open top 21d for insertion of hoses 11 is desirable, other means may be employed to cover top opening 21d to the extent that it is desired to prevent hoses 11 from leaving the cradle 21 during times when the unit 10 is in use, including but not limited to alternative containment means such as removable bungee cords, straps with hook and loop fastening means, or the like.

Cradle member 21 of cradle assembly 20 is radially curved from first end 22 to second end 23 within a range of 1° to 90° over and about the upper end 31 of support 30. In the embodiments shown, cradle 21 rests on upper end 31 of support 30 approximately equidistant between first end 22 and second end 23.

The main cradle body 21 is held moveably in place on upper end 31 of support 30 by one or more extension springs 27, with at least one extension spring 27 attached to the first side 21a of cradle 21, and at least one extension spring 27 attached to the second side 21b, of cradle 21. As will be described in additional detail, an advantage of utilizing springs or other resiliently deformable structure is to provide any degree of multi-axial bending, pivoting or rotating motion, depicted as x, y and z arrow designations at 25', 27' and 29' in FIG. 2, and which reflects the multi-directional deflecting and displacing characteristics of the cradle assembly 20 responding to such as pulling forces exerted by the supported conduits 11, such an in response to various articulating positions established between the truck and trailer.

When one extension spring 27 is used on each of sides 21a and 21b of cradle 21, each is attached at its first end 27a directly above support 30 and extends directly downward and is attached as its second end 27b to support 30 proximate upper end 31, as shown in FIG. 5. Threaded bolts 28 and correspondingly threaded apertures 29 are used for attaching both ends of springs 27, although the means of attachment may be rivets, hooks or other common fasteners.

In FIG. 4, an embodiment using a pair of extension springs 27 on both sides 21a and 21b of cradle 21 is shown. In such case, the first end 27a of each of the pair of springs 27 are fixed equidistant B on opposite sides of the extended axis B-B of Support 3 and second ends 27b of springs 77 are fixed substantially together on upper end 31 of Support 30.

As seen from the drawings, in particular as designated by arrows previously identified at 25', 27' and 29', the use of extension springs 27 will allow cradle 21 to pivot on upper end 31 of Support 30, in each of fore and aft, side to side and, when necessary, up and down. In one non-limiting application, a pair of equal extension springs 27 are placed on each of sides 21a and 21b, from side to side as well, with the cradle 21 being returnable to its original position, as shown, by contraction of extension springs 27.

Without limitation, the radial curve of the main cradle body or portion 21 from the first end 22 to the second end 23 can exhibit any arcuate dimension as measured in degrees and, in one variant, can exhibit a range of 45° to 90°. The unitary radial concave surface, among other advantages, holds the conduits 11 without kinking, and minimizes single point abrasion by spreading contact of the conduit 11 equally over the entire bottom inner concave surface of the cradle 21 from the first end 22 to the second end 23.

Figure 3:
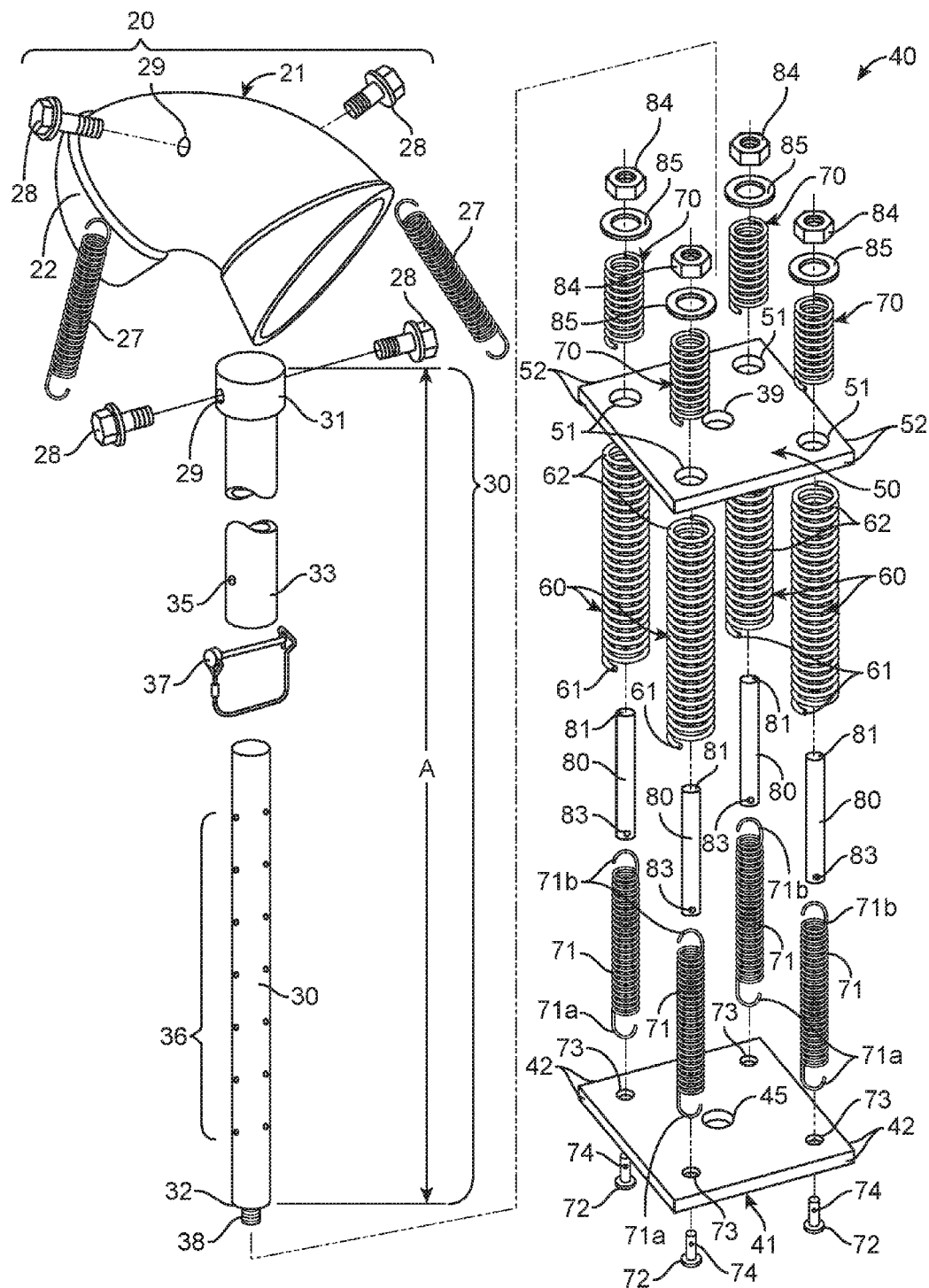
FIG. 3 is an exploded view of the cradle of FIG. 2, showing all component parts in relation to each other.

In addition to the essentially 360° movement provided for cradle assembly 20 atop the support assembly 30, additional flexible movement of the device is provided by base assembly 40 shown in cross-section 6-6 of FIG. 5, and as detailed in FIG. 6, as well as in perspective, in FIG. 2, and in exploded view in FIG. 3.

Base assembly 40 is comprised of two plates, positioned substantially in parallel. A lower plate member 41 with a defined perimeter edge 42, also has a top side 43 and a bottom side 44. The bottom side 44 is positioned in contact with bed 14 of truck tractor 12 when the device 10 is used in standard operation. Lower plate 41 further defines an aperture 45 through which a bolt or other fastening device may be inserted to hold the device 10 in contact with bed 14. In practice, the invention is not limited by the method of affixing lower plate 41 to bed 14, and straps or clamps or other means sufficient to maintain contact under force may be used. Positioned above lower plate 41 is upper plate 50, which, as stated, is substantially in parallel with lower plate 41. Upper plate 50 has a defined perimeter 52, substantially corresponding with the perimeter 42 of lower plate 41. Upper plate 50 has a top side 53 and a bottom side 54.

A plurality of supporting lower compression springs 60 are spaced equidistantly around the perimeter of lower plate 41, as shown in FIGS. 2 and 3. Upper plate 50 is situated above lower plate 41 with perimeter 42 corresponding to and aligned with perimeter 52. Lower compression springs 60 support upper plate 50 at a defined distance C above lower plate 41.

Upper plate 50 has a plurality of holes or apertures 51, corresponding and equal to the number of lower compression springs. Each aperture 51 is centered above a corresponding lower compression spring 60. Each lower compression spring 60 has a lower end 61 and an upper end 62 and all of the plurality of lower compression springs 60 are of equal length which, at rest, is distance B, and are placed between the bottom side 54 of upper plate 50 and the top side 43 of bottom plate 41.

A plurality of upper compression springs 70 rest upon top side 53 of upper plate 50 and correspond with the plurality of lower compression springs 60, and the plurality of apertures 51 in upper plate 50. Each upper compression spring 70 is centered on top side 53 over a corresponding aperture 51.

Moveably expandable within each lower compression spring 60 is a contained extension spring 71. Each extension spring 71 has a first end 71a attached to bottom plate 41 directly below the corresponding lower compression spring member 60 within which it is contained. The method of attachment of spring 71 to bottom plate 41 does not limit the invention, but in the embodiments shown is accomplished by a clevis-type pin member 72 extending upwardly through a corresponding aperture 73 through bottom plate 41. As used herein, "clevis-type" means an unthreaded pin with a perpendicular hole 74, through which the corresponding first end 71a and extension spring 71 may be inserted. Each extension spring 71 further has a second end 71b.

A plurality of clevis-type bolts 80 corresponding to the plurality of upper compression sprigs 70 extend downward through upper compression spring 70 and into each aperture 51 in upper plate 50. Each bolt 80 has an upper end 81 and a lower end 82.

As used herein, a "clevis-type" bolt is a threaded headless bolt having perpendicular hole or orifice 83 perpendicularly therethrough. In the embodiment shown, lower end 82 of clevis-type bolt 80 is connected to its corresponding extension spring 71, by insertion of second end 71b through orifice 83 as shown in FIG. 6. Bolt 80, at upper end 81, is adjustably held in place at desired tension by a correspondingly threaded nut 84 placed above a spring-retaining washer 85. A groove 86 is provided in upper end 82 of clevis-bolt 80 to aid in preventing rotation when nut 84 is tightened or loosened.

Thus, in operation of device 10, when pressure from the supported flexible conduits 11 exerts any directional force against the cradle assembly 20 and against the support assembly 30 the upper compression springs 70 and lower compression springs 60 on opposite sides of upper plate 50 compress with the force, showing upper plate 50 to returnably tilt in the direction in which the force is being asserted, easing pressure on support 30, and cradle assembly 20, with the contained extension springs 71 returning the upper plate 50 to substantially horizontal position, parallel to lower plate 41 after the force has subsided.

In the preferred embodiment shown in the drawings, four combination compression/extension spring assemblies, each comprised of a lower compression spring 60, an upper compression spring 70, and contained extension spring 71 are utilized, through other pluralities of such assemblies, spaced equidistant around perimeters 42 and 53 and between upper plate 50 and lower plate 41 would suffice. As further referenced in FIG. 6, a side cut away view of the horizontal lower and upper support plates of the vertical support shows the lower and upper compression spring members, contained expansion spring member, and clevis-type bolt attachments, both on the lower base plate and above the upper base plate.

It is envisioned that the support and base assemblies as described can, in further variants, be substituted by a single elongate tabular member, such as which includes at least an upper elongate portion as shown at 33 as depicted in FIG. 2 for supporting the cradle assembly 20, and which can secure at a lower end to the truck platform 14. Such an elongate support can further incorporate such as a cast material which integrates an intermediate coiled spring portion, the design of which in combination with the deflecting material properties integrated into the elongate portion being capable of providing many of the same multidirectional bending, rotating, and extending properties as which are enabled by the design of the base assembly 40 in the illustrated embodiment.

Figure 7:
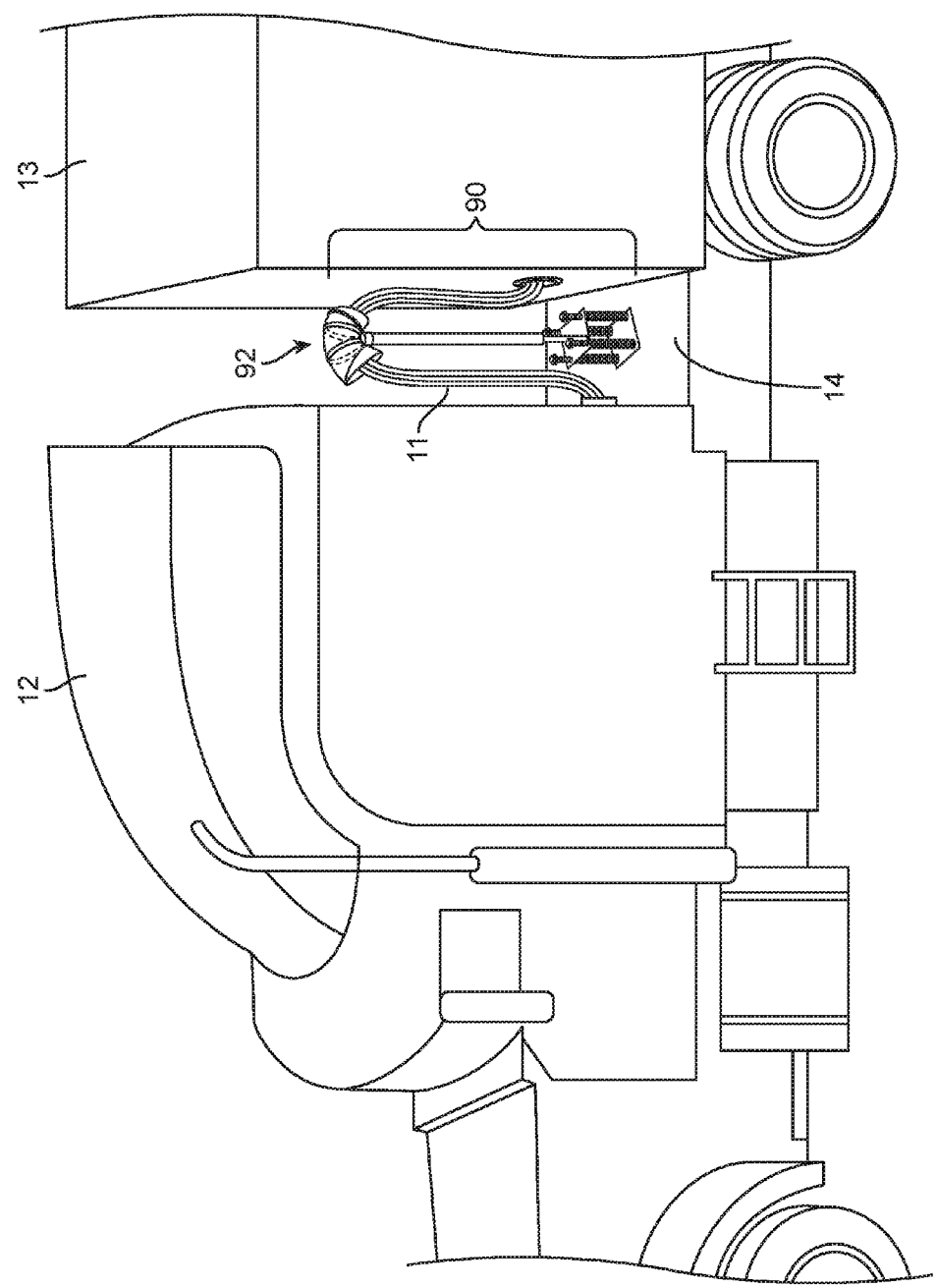
FIG. 7 is an environmental perspective view of a tractor trailer assembly, including the rearward portion of a truck tractor and the forward portion of an attached and inter-articulating truck trailer, showing the elevated cradle according to a further variant supporting an intermediate portion of the extending conduit.

Referring now to FIG. 7, an environmental perspective view is again shown of a tractor trailer assembly, similar to as depicted in FIG. 1 and again including the rearward portion of a truck tractor 12 and the forward portion of an attached and inter-articulating truck trailer 13, and showing an elevated overall assembly, generally at 90, according to a futher variant for supporting an intermediate portion of the extending conduits forming the harness 11. For purposes of the description of FIGS. 7-10, the support 30 and base 40 assemblies are repeated from the initial embodiment, such that a repetitive description of identical features is unnecessary. That said, and as previously described, it is envisioned that these subassemblies can be substituted by any elevating support structure for arraying an uppermost cradle subassembly, see as further generally shown at 92, at an elevated location for facilitating such as installation of intermediate locations of the conduit harness 11, these such as again potentially including a single elongated member integrating any degree of resilient and deformable properties for absorbing pulling, twisting, or lifting forces exerted by the harness in response to articulation of the truck trailer relative the tractor.

Figure 8:
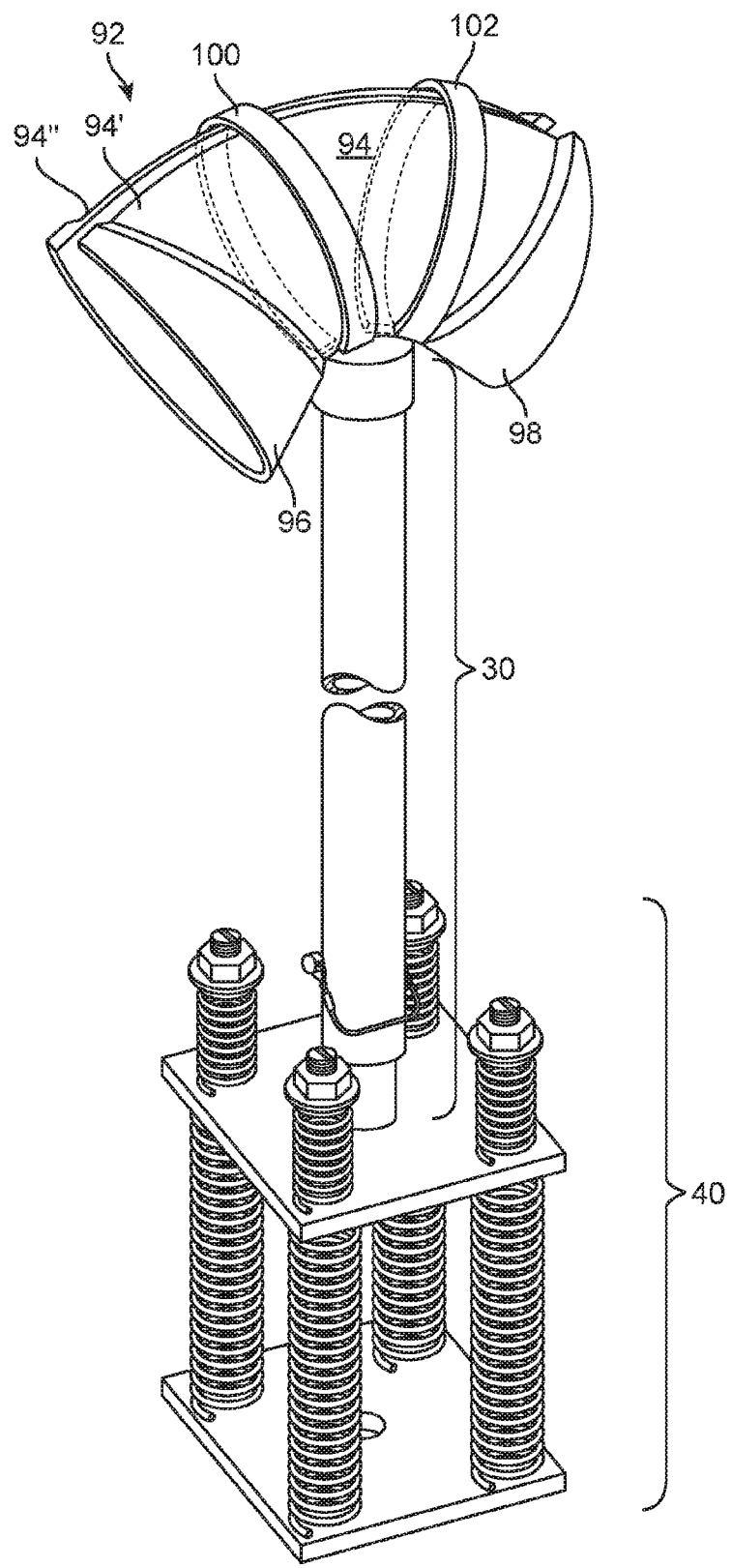
FIG. 8 is an enlarged and perspective illustration of the cradle according to FIG. 7.
Figure 9:
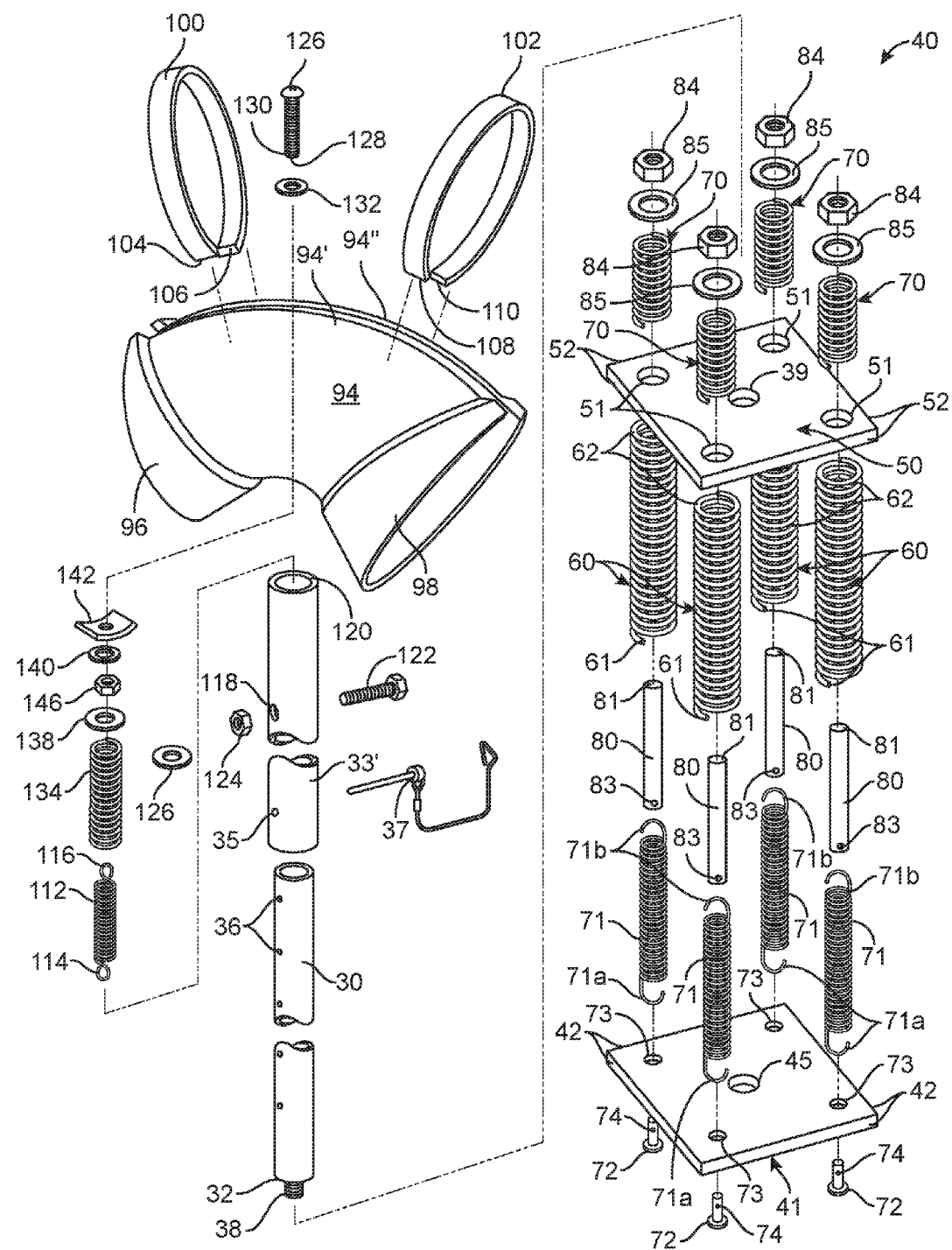
FIG. 9 is an exploded view of the cradle of FIG. 8, showing all component parts in relation to each other.

FIG. 8 is an enlarged and perspective illustration of the overall assembly according to FIG. 7 and, in combination with the exploded view of FIG. 9, better illustrates the component parts of the various subassemblies and, particularly, the cradle subassembly 92. As previously described, the cradle can exhibit an arcuate shape and may further be separable to permit lay-in receipt of an intermediate location of the conduits.

Figure 10:
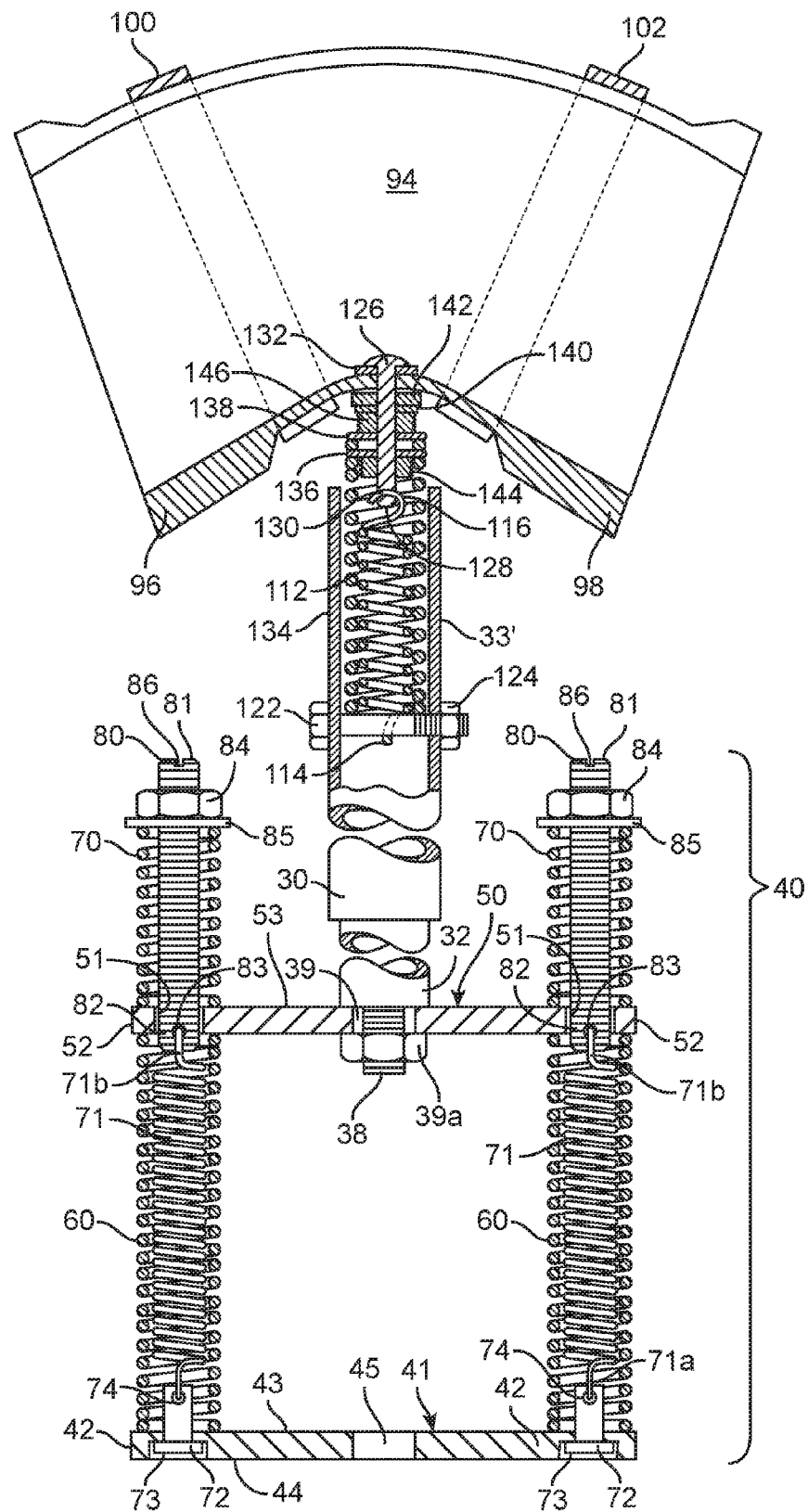
FIG. 10 is a side cutaway view of the horizontal lower and upper support plates of the vertical support, showing the lower and upper compression spring members, contained expansion spring member, and clevis-type bolt attachments, both on the lower base plate and above the upper base plate, as well as depicting a pair of concentric positioned springs supported within an open upper end of the vertical member for resiliently supporting the cradle of FIG. 7 in multi-directional deflection absorbing fashion.

Referencing FIGS. 8-10 collectively, the further depicted valiant of the cradle assembly 92 provides an arcuate and open interior body 94 having a first open end 96 and a second open end 98. The body 94 is similar to that previously depicted at 21 in FIG. 2, with the exception that it exhibits an upper edge extending slit or incision between the open ends 96 and 98, this configuring the main body 94 into upper edge accessible split portions 94' and 94". The construction of the body 94 is further such that the split portions can be pulled apart a suitable separation distance for laying in the conduit 11.

A pair of resilient bands 100 and 102 are shown and which, by non-limiting design, can be constructed with split lower ends (see further opposing end surfaces 104/106 and 108/110 of bands 100 and 102). The bands 100 and 102 or clips can be constructed of any metal or heavy duty plasticized material exhibiting a sufficient degree of deformability and resiliency to permit the bands to be detached, the split portions 94' and 94" to be separated to permit lay-in installation of the harness 11 and without necessitating disconnection from either of the tractor or trailer portions, following which the bands 100 and 102 are reinstalled as shown in FIG. 8 by pulling apart sufficiently to encompass the circumference of the main body 94, following which the bands revert to their enclosing shape as best shown in FIG. 9 and in order to assist in maintaining a closed supporting position about the main body 94 and interiorly supported harness 11. Additional to the deformable split ring variant shown, it is envisioned that other types of C clamps, strap shaped closure bands and the like can be utilized in combination with the linearly split main cradle body 94 in order to facilitate easy lay-in support of the conduit harness 11.

The manner in which the cradle subassembly 92 is supported atop the vertical member, again previously described by elongate member 30 and (for purposes of FIGS. 7-10) a modification 33' of the uppermost telescoping member, such that cradle is permitted any degree of multi-axial (e.g. eccentric) pivotal and/or displaceable support (reference again being made to the multi-directional arrows 25', 27' and 29' in FIG. 2) in response to articulation between the tractor and trailer, the laid-in conduits further being allowed to displace (in internally slided fashion and again resulting from the pulling forces resulting from such as articulation between the tractor and trailer) relative to the elevated and supporting location provided by the cradle.

Either of a single or dual concentric coil spring configuration can be provided as depicted in FIGS. 9 and 10 to provide the main cradle body 94 with the desired resilient deformation properties relative to the upper telescoping section 33' of the elongated body assembly (this again in combination with the main elongate 30 and by which aligning apertures 35 and 36 receive a pin 37 to establish an overall height). As best shown in FIG. 9, the spring configuration includes an inner coil spring having a main body 112 terminating at curled lower 114 and upper 116 ends.

An aperture 118 is formed in widthwise fashion through a location of the upper telescoping portion 33' (shown in reduced length in FIG. 9) which is a distance below an open upper end 120. As further shown in FIG. 10 the inner spring 112 is supported within the open upper end 120 of the upper telescoping elongate portion 33 so that a widthwise inserting bolt fastener 122 with end nut 124 installed through the aperture 118 captures the lower curled end 114 of the spring 112.

A further bolt 126 is provided and exhibits a width aperture 128 configured into an end proximate location of an extending stem of the bolt 126. As best shown in the cutaway of FIG. 10, the bolt 126 installs in a downward fashion through an aperture 130 in the lowermost middle of the base of the main body portion 94, so that the underside of the enlarged head of the bolt 126 and a corresponding washer 132 shoulders against the inside surface of the main cradle body 94. The upper curled end 116 of the inner coil spring 112 engages through the aperture 130 of the bolt 126, in the manner shown, in order to resiliently and biasingly support the cradle subassembly 92 atop the open end of the upper telescoping portion 33'.

An outer concentric positioned spring is shown at 134 and, as shown in FIG. 10, is seated within the open end of the upper telescoping portion 33', around the inner coil spring 112, and in a manner such that its lower end biases against the width inserting fastener 122. A first washer 136 inserts below an uppermost coil winding of the outer coil spring 134 (see again FIGS. 9-10) and, in combination with an upper located further pair of springs 138 and 140 and is top most arcuate shaped positional support 142 abutting a bottom surface of the main cradle body 94 in alignment with the aperture 130, provides support of the interiorly and downwardly inserting stem of the fastener 126.

As further shown in FIG. 10, a pair of spaced nuts 144 and 146 can be located upon the stem of fastener 126 and assembled in a manner to pinch the washers 136 and 138 against opposite surfaces of the upper most end winding of the outer coil spring 134, and so as to maintain the coil spring 134 in a compressing (upward) biased fashion with the cradle 94, separately to a downward bias exerted by the inner coil spring 112. Without limitation, any arrangement spring or springs can be integrated in order to provide resilient support for the cradle in response to bending forces introduced by the pulling of the conduits against the inner supporting surfaces of the cradle.

Having described my invention, other and additional preferred embodiments will become apparent to those skilled in the art to which it pertains, and without deviating from the scope of the appended claims.

The invention claimed is:

1. A cradle for supporting an extending length of a harness extending between a truck and an articulating trailer, comprising:

a body with first and second ends defining at open interior, said body being separable along a linearly extending location between said ends in order to receive an intermediate length of the harness;

a vertically extending member comprising a lower end which is adapted for being supported on a platform located within an open space between the truck and trailer; and a resilient biasing structure for supporting said body atop said vertically extending member and which is responsive to forces exerted upon the harness resulting from articulation between the truck and trailer in order to permit said body a degree of force absorbing and multi-directional motion relative to said vertically extending member, said resilient biasing structure further comprising:

a first coil spring having a main body terminating at a curled lower end and a likewise curled upper end, said spring being supported within an open upper end of said vertical member so that a widthwise inserting bolt fastener is installed through said member to capture said lower curled end, a bolt installing in downward fashion through a base located aperture in said body, an aperture in an endmost portion of a stem of said bolt capturing said upper curled end, a second coil spring supported within said open upper end of said vertical member in concentric fashion about said first coil spring, a bottom end of said second spring biasing against said widthwise inserting bolt fastener, a top end of said second spring biasing said downward installed bolt, and a first washer inserting below an uppermost coil winding of said second coil spring and, in combination with at least one additional washer abutting against said top end of said second spring, is forced into contact by a nut supported upon said stem downwardly extending bolt.

2. The cradle as described in claim 1, said body further comprising linearly extending and opposing edges defining first and second split portions.

3. The cradle as described in claim 2, further comprising at least one clamping member surrounding an exterior circumference of said body following lay-in receipt of the harness.

4. The cradle as described in claim 3, further comprising a pair of resilient rings having split openings to facilitate manipulating installation over said body.

5. The cradle as described in claim 1, at least one additional washer further comprising an upper located pair of springs and a top most arcuate shaped positional support abutting a bottom surface of said body in alignment with said base located aperture for providing support with said interiorly and downwardly inserting stem of said downward installed bolt.

6. The cradle as described in claim 1, said nut supported upon said stem downwardly extending bolt further comprising a pair of spaced nuts located upon said stem of said downwardly extending bolt assembled in a manner so as to pinch said first washer and a selected one of said second washers against opposite surfaces of said uppermost coil winding of said second coil spring so as to maintain said second coil spring in a compressing (upward) biased fashion with said body, separately from a downward bias exerted by said first coil spring.

7. The cradle as described in claim 1, said body exhibiting a radial curve between said ends at a defined angle within a range of 10° to 90°.

8. The cradle as described in claim 1, said vertically extending member further comprising:
 a base mounting member
 a support member having an upper end and a lower end; and
 said lower end of the support member affixed to the base member and the support member extending upwardly therefrom.

9. The cradle as described in claim 1, further comprising height adjustability of said vertically extending member defined by a distance between its upper end and lower end.

10. The cradle as described in claim 9, said vertically extending member further comprising a first tubular component and a second tubular component, wherein said second tubular component is conformed to fit slidably within said first tubular component, said first and second tubular components being fixed at a plurality of linearly displaced positions.

11. The cradle as described in claim 10, further comprising a plurality of vertically aligned apertures on opposing sides of said first tubular component and a corresponding plurality of pairs of vertically aligned apertures on opposing sides of said second tubular component, a pin seating through aligning pairs of apertures in said first and second tubular components for configuring a desired height of said vertically extending member.

12. A cradle for supporting an extending length of a harness extending between a truck and an articulating trailer, comprising:
 a body with first and second ends defining at open interior, said body being separable along a linearly extending location between said ends in order to receive an intermediate length of the harness;
 a vertically extending member comprising a lower end which is adapted for being supported on a platform located within an open space between the truck and trailer, said vertically extending member further comprising: a base mounting member, a support member having an upper end and a lower end, wherein said lower end of the support member affixed to the base member and the support member extend upwardly therefrom; and
 a resilient biasing structure for supporting said body atop said vertically extending member and which is responsive to forces exerted upon the harness resulting from articulation between the truck and trailer in order to permit said body a degree of force absorbing and multi-directional motion relative to said vertically extending member wherein said base mounting member further comprises:
 a lower plate member and an upper plate member aligned in parallel; said plate members having defined, corresponding perimeter edges; a plurality of lower compression spring members of equal length supporting the upper plate member above the lower plate member; said plurality of lower compression spring members aligned a substantially equal intervals proximate the corresponding edges of the upper and lower plate members;
 a corresponding plurality of extension spring members, each located within one of the lower compression spring members, and each having a first end attached to the lower base member, and a second end extending upwardly through the corresponding compression spring member;
said upper plate member further defining a plurality of apertures corresponding to the plurality of lower compression spring members and contained extension spring members;
 a plurality of upper compression spring member corresponding to and centered above the plurality of defined apertures of the upper plate member; each upper compression spring member containing a threaded clevis-type bolt member, extending downwardly therethrough and through the corresponding aperture; each bolt having a lower end and an upper end; each bolt connected at its lower end to the corresponding extension spring at its upper end; and each threaded clevis-type bolt being held at its upper end by a conformingly threaded nut.

* * * * *